United States Patent [19]

Ogawa et al.

[11] Patent Number: 5,782,960
[45] Date of Patent: Jul. 21, 1998

[54] HYDROGEN SEPARATION MEMBER

[75] Inventors: Makoto Ogawa; Toshiro Kobayashi; Minoru Sueda; Takahiro Matsumoto; Tetsuya Imai; Shigenori Shirogane; Hiroshi Shiota; Toshiuki Uchida; Shinsuke Ota, all of Hiroshima-ken, Japan

[73] Assignee: Mitsubishi Jukogyo Kabushiki Kaisha, Japan

[21] Appl. No.: 819,411

[22] Filed: Mar. 17, 1997

[30] Foreign Application Priority Data

Mar. 18, 1996 [JP] Japan .................................. 8-060883

[51] Int. Cl.$^6$ ............................................ B01D 53/22
[52] U.S. Cl. ............................ 96/11; 95/56; 96/4
[58] Field of Search ............................ 55/524; 95/55, 95/56; 96/4,11

[56] References Cited

U.S. PATENT DOCUMENTS

| | | | |
|---|---|---|---|
| 3,238,704 | 3/1966 | Straschil et al. | 96/11 |
| 3,336,730 | 8/1967 | McBride et al. | 95/56 |
| 3,469,372 | 9/1969 | Yamauchi et al. | 96/11 |
| 3,828,527 | 8/1974 | Briggs et al. | 96/4 |
| 4,085,048 | 4/1978 | Croset et al. | 96/11 X |
| 4,254,086 | 3/1981 | Sanders | 95/56 X |
| 4,971,696 | 11/1990 | Abe et al. | 96/11 X |
| 5,498,278 | 3/1996 | Edlund | 95/56 X |
| 5,641,332 | 6/1997 | Faber et al. | 96/4 X |
| 5,645,626 | 7/1997 | Edlund et al. | 95/56 |
| 5,681,373 | 10/1997 | Taylor et al. | 96/11 |

FOREIGN PATENT DOCUMENTS

| | | | |
|---|---|---|---|
| 59-183806 | 10/1984 | Japan | 96/4 |
| 59-213402 | 12/1984 | Japan | 96/11 |
| 6-007630 | 1/1994 | Japan | 96/4 |
| 0966122 | 8/1964 | United Kingdom | 95/56 |
| 1325426 | 8/1973 | United Kingdom | 95/56 |

*Primary Examiner*—Robert H. Spitzer
*Attorney, Agent, or Firm*—Michael N. Meller

[57] ABSTRACT

A hydrogen separation membrane has a hydrogen-permeable metal foil laminated to a porous metal support. The metal support comprising a laminate of metal-reinforcing plates each having a plurality of hydrogen-flow-through holes. The metal-reinforcing plates have rectangular or similarly shaped holes having longitudinal and lateral axes. The laminate is assembled so that the longitudinal axes of the holes of adjacent metal-reinforcing plates intersect substantially at right angles with each other.

17 Claims, 6 Drawing Sheets

HYDROGEN SEPARATION MEMBER

BACKGROUND OF THE INVENTION

The present invention relates to a hydrogen separation member which may be applied to high-purity hydrogen gas manufacturing or purifying units. More particularly, the present invention relates to a hydrogen separation membrane which is more efficient and less costly than presently available membranes.

The principle of manufacturing high-purity hydrogen by a hydrogen separation membrane consists of bringing a hydrogen-containing feed gas at higher pressure than that of the high-purity hydrogen end product into contact with the input side of a hydrogen separation membrane. The membrane uses a hydrogen-permeable metal foil or the like, thereby permitting only hydrogen to pass through and harvesting high-purity hydrogen from the output or opposite side of the membrane. In order to improve the capacity of manufacturing high-purity hydrogen gas, one may propose: (a) to improve the hydrogen-permeation capability of the hydrogen-permeable metal foil itself; (b) to increase the hydrogen flux across the metal foil by using a thinner hydrogen-permeable metal foil; and/or (c) to increase the pressure difference between the front (input) side and the back (output) side of the hydrogen-permeable metal foil, that is, the pressure difference between the feed gas and the high-purity hydrogen-gas sides (hereafter simply pressure difference).

Option (c) requires reinforcing the hydrogen-permeable metal foil by some means so that it can withstand such pressure difference. However, reinforcements generally end up restricting the hydrogen path, resulting in a greater pressure loss or a greater permeation resistance, and reducing the capacity to manufacture purified hydrogen gas. Thus, a variety of means have been studied that can increase the pressure difference, yet can avoid restricting the path for the high-purity hydrogen.

Figure 5:
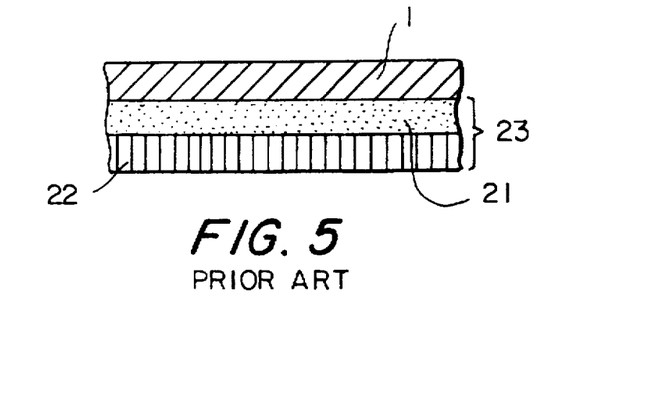
FIG. 5 is a cross-sectional view of the thickness of a conventional hydrogen separation membrane structure.

As one of such means, the inventors of the present application previously proposed a hydrogen separation membrane, as illustrated in FIG. 5, having a hydrogen-permeable metal foil 1 bonded to a porous metal member 23 made up of a metal-fiber nonwoven fabric 21 and a metal screen 22 (Japanese Patent Application Publication Kokai H5-203250). This provided a hydrogen flux of 15–60 Ncc/min·cm² (500° C., differential pressure 2 kgf/cm² G) per unit area of the hydrogen-permeable metal foil. This type of hydrogen separation membrane should require a pressure difference of 5 kgf/cm² G at a temperature of 500° C. or higher for a practical hydrogen-manufacturing rate, where heating and pressurization cycles at these levels are repeated in start-ups and shutdowns in daily operations. The needed resistance to such conditions has also been achieved.

Figure 6:
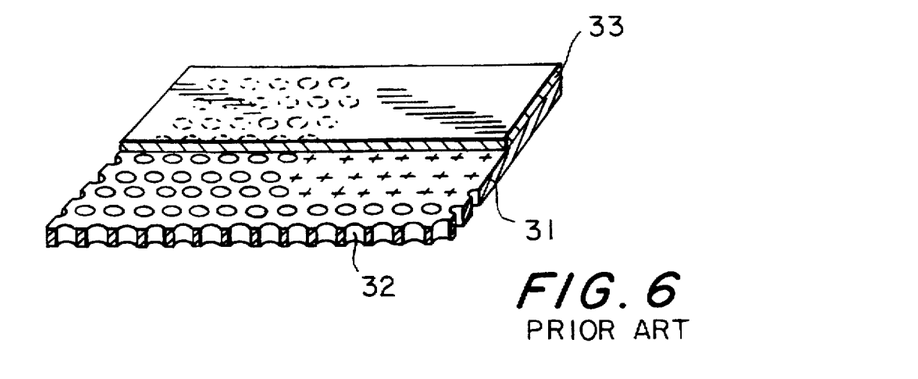
FIG. 6 is a perspective view of another example of the structure of a conventional hydrogen separation membrane.

The present inventors have also proposed other means (Japanese Patent Publication Kokai H5-76738), as illustrated in FIG. 6, for a hydrogen separation membrane comprising a structure in which a palladium thin film 33 is laminated to a porous metal support 31 having a large number of small holes 32 drilled therethrough. This hydrogen separation membrane can reduce the hydrogen-permeation resistance compared to the use of the aforementioned metal porous member comprised of a metal-fiber nonwoven fabric and a metal screen, with the result of improving the hydrogen flux to 25 Ncc/min·cm² (500° C., differential pressure 2 kgf/cm² G) at a 50% open area of the porous metal support.

Hydrogen separation membranes having structures, illustrated in FIGS. 5 and 6, provide for certain levels of hydrogen-manufacturing capabilities. However, greater improvements in hydrogen-manufacturing capabilities and manufacturing-cost reductions are needed before these hydrogen separation membranes can be applied to high-purity hydrogen manufacturing facilities or to electrical-generation systems in combination with fuel cells.

In particular, the type of structure shown in FIG. 6 uses a support or reinforcing plate with small circular holes drilled through the thickness of the plate so that the percentage opening of the reinforcing plate, even for such small holes, can be only as high as 50%. The structure in which the small holes communicate through individual small holes through the entire thickness of the reinforcing plate requires the hydrogen to diffuse along the entire plate thickness, resulting in increased resistance. Thus, this structure may not provide sufficient hydrogen-manufacturing capabilities.

In view of the aforementioned state of the prior art, the present invention proposes hydrogen separation membranes which can be fabricated at a lower cost than a hydrogen separation membrane having the prior art structure, can improve the efficiency of hydrogen manufacturing, and can provide a product configuration of flat-sheet types and tubular types which can be readily manufactured.

SUMMARY OF THE INVENTION

It is accordingly an object of the present invention to provide a hydrogen separation member which overcomes the disadvantages of the prior art.

Another object of the present invention is to provide a membrane for separating purified hydrogen from a hydrogen-containing gas. The membrane includes a hydrogen-permeable member adapted to have the hydrogen-containing gas applied to an input side thereof to produce substantially pure hydrogen at an output side. A plurality of reinforcing members are mounted adjacent the output side of the hydrogen-permeable member so that substantially all of the hydrogen gas passing through the output side also passes through the reinforcing members. Each of the reinforcing members has a plurality of holes therein, each of the holes having a longitudinal and a lateral axis. The longitudinal axis is substantially longer than the lateral axis and the reinforcing members are mounted such that the longitudinal axes of the holes of adjacent reinforcing members intersect.

In a preferred embodiment, the holes in the reinforcing members are rectangular and the longitudinal axes intersect at substantially a right angle.

In a further preferred embodiment, the hydrogen-permeable member is a metal foil and the reinforcing members are substantially planar.

In yet another preferred embodiment, the reinforcing members are laminated to the output side of the hydrogen-permeable member.

The apparatus incorporating the principles of the present invention may include a hydrogen separation membrane having a hydrogen-permeable metal foil laminated to a porous metal support. The metal support comprises a laminate of metal-reinforcing plates, each having a plurality of hydrogen-flow-through holes, wherein the metal-reinforcing plates have elongated holes, each hole having a longitudinal axis. A plurality of the metal-reinforcing plates are laminated together so that the longitudinal axes of the holes of adjacent metal-reinforcing plates intersect each other.

A hydrogen separation membrane incorporating the principles of the present invention is preferably constructed so that a hole of one metal-reinforcing plate overlaps at least two holes of the adjacent metal-reinforcing plate.

Preferably, of the metal-reinforcing plates, the metal-reinforcing plate in contact with the hydrogen-permeable metal foil is thin and narrow in spacing between the pillars thereof, and is laminated to a series of a second plate and succeeding plates which are increasingly thicker and wider in pillar-to-pillar spacing.

A palladium foil or a palladium-containing alloy foil is suitable as a hydrogen-permeable metal foil constituting the hydrogen separation membrane incorporating the principles of the present invention. Palladium-containing alloys are preferably, for example, alloys comprising palladium and silver; alloys comprising at least one metal selected from the group consisting of yttrium and the rare earth elements, and palladium, or alloys comprising at least one metal selected from the group consisting of yttrium and the rare earth elements, palladium, and silver.

The alloys containing at least one metal selected from the group consisting of yttrium and the rare earth elements and palladium in this invention are preferably alloys containing 1–20% by weight of at least one metal selected from yttrium and the rare earth elements and at least 60% by weight of palladium, or additionally, not more than 30% by weight of silver. The above alloys may contain not only at least one metal selected from the group consisting of yttrium and the rare earth elements, palladium, and silver, but also group VIII elements such as platinum, rhodium, ruthenium, iridium, iron, nickel, cobalt, and the like, group Ib elements such as copper, gold and the like, and VIa elements such as molybdenum. Use of an alloy foil of such a material can further improve the hydrogen flux performance.

BRIEF DESCRIPTION OF THE DRAWINGS

The above and other objects, features, and advantages of the present invention will become more apparent from the following detailed description taken with respect to the accompanying drawings, in which:

FIG. 1, made up of FIGS. 1($a$) and 1($b$) illustrates the thickness of the reinforcing plate used in an Example 1 and its hole configuration and dimension;

FIG. 2, made up of FIGS. 2($a$)–2($d$), schematically details the fabrication steps of the hydrogen separation membrane member used in Example 1;

FIG. 3, made up of FIGS. 3($a$)–3($d$), schematically shows the shape of the reinforcing plate used in an Example 2 and the fabrication steps for a hydrogen separation membrane member;

FIG. 4, made up of FIGS. 4($a$) and 4($b$) schematically shows the fabrication steps used for a hydrogen separation membrane member of an Example 3;

FIG. 7, made up of FIGS. 7($a$) and 7($b$) illustrates the thickness of a reinforcing plate incorporating the principles of the present invention and its hole configurations;

DESCRIPTION OF THE PREFERRED EMBODIMENTS

Figure 7A:
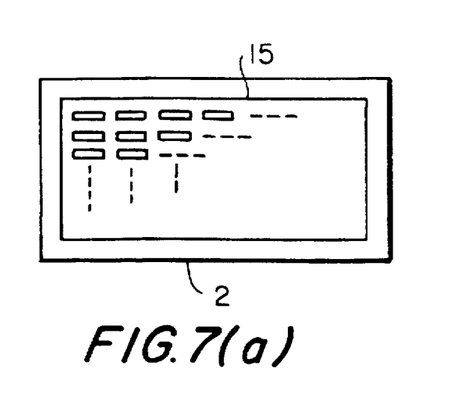
Figure 7B:
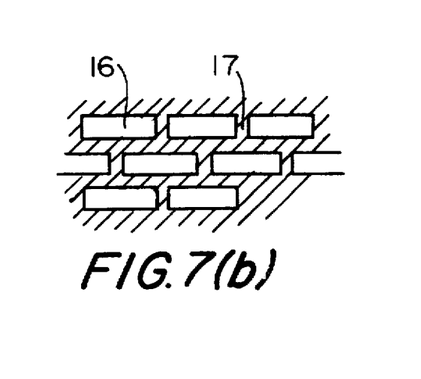

Referring to the drawings, the hydrogen separation membrane incorporating the principles of the present invention comprises a thin hydrogen-permeable member such as a metal foil only 2–50 μm thick in combination with a plurality of reinforcing plates with a large number of rectangular or similarly shaped holes (including elongated oval, rhomboid-shaped holes), which are holes having shapes with a longitudinal (major) axis and lateral (minor) axis. In such holes, the longitudinal axis is substantially longer than the lateral axis. Such holes shall be termed "elongated" holes. An embodiment of such a reinforcing plate is shown in FIG. 7. FIG. 7($a$) is a schematic plan view of a reinforcing plate 2; FIG. 7($b$) is an expanded or magnified plan view of the openings thereof, which illustrates the shape of an elongated hole, where 15 is an opening, 16 is a hole, and 17 is a pillar. In this embodiment, the elongated hole is a rectangular hole. Reinforcing plates (porous plates) having such shaped holes can be fabricated by an etching and the like procedure up to an opening of about 90% and can ensure a sufficient path for the purified hydrogen.

Figure 8:
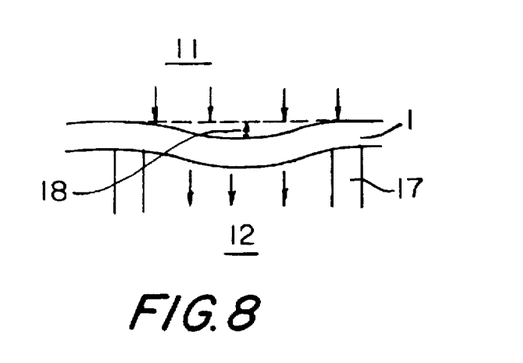
FIG. 8 is a schematic representation illustrating how a deflection develops when a reinforcing-plate reinforced hydrogen-permeable metal foil is used.

The hydrogen-permeable metal foil reinforced with a reinforcing plate having an opening, as shown in FIG. 7, develops, as illustrated in FIG. 8, a deflection 18 due to the pressure difference between a feed gas 11 and the purified hydrogen gas 12. If the deflection is too high, the foil would break. In order to minimize the deflection of the metal foil due to the pressure difference between the front or input side (higher pressure feed gas) and the back or output side (lower pressure purified hydrogen) of the metal foil, it is necessary to reduce the size of the individual opening (the spacing between each pillar portion). In order to maintain the strength of the reinforcing plate itself, the reinforcing plate should have a sufficient thickness. However, as the thickness increases, it becomes difficult to fabricate an opening with a small spacing between each pillar. Therefore, it is preferred to have a structure starting with a first reinforcing plate in contact with the hydrogen-permeable metal foil, such plate being thin and having an opening with a small spacing between each pillar. A reinforcing plate thicker than the first plate and having an opening with a greater spacing between each pillar is laminated to the first plate. This is followed in sequence by a thicker reinforcing plate with greater spacing between each pillar to produce the overall laminate.

Figure 9:
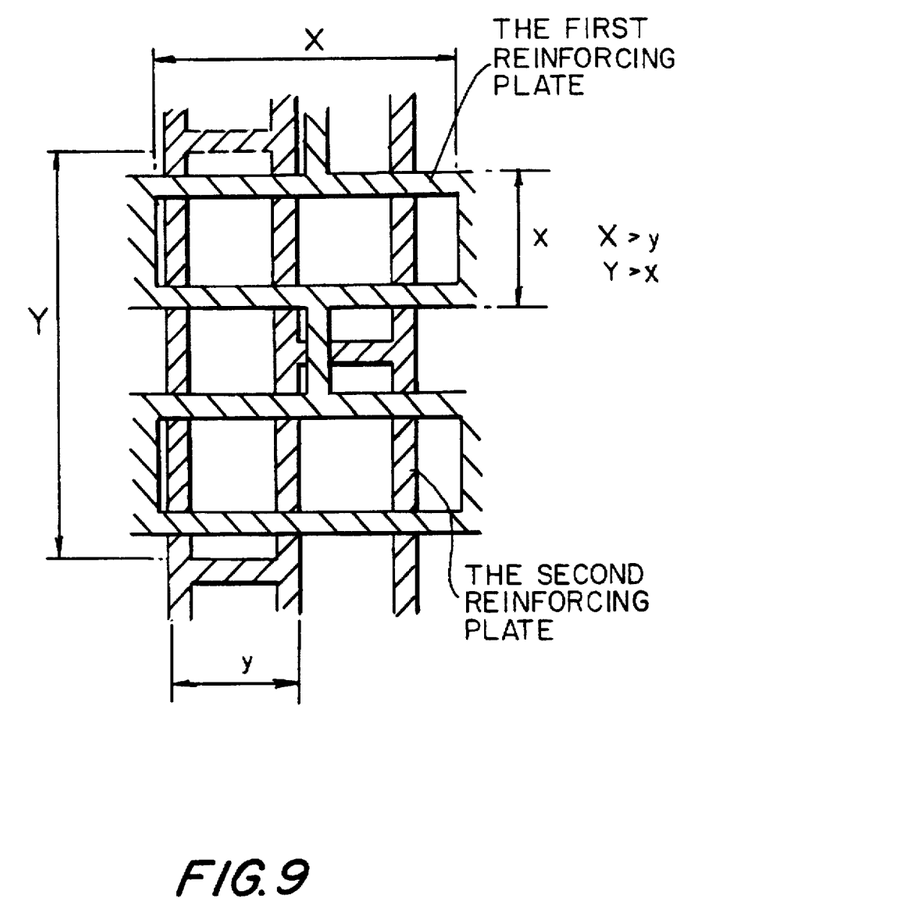
FIG. 9 is a cross-sectional diagram illustrating the relationship between the hole sizes of reinforcing plates used in a hydrogen separation membrane member incorporating the principles of the present invention.

With the above construction, the reinforcing plate in contact with the metal foil is combined with the next reinforcing plate so that the longitudinal axes of the rectangular openings of each of the plates intersect, preferably at right angles. A similar arrangement is made when three or more reinforcing plates are used so that the respective longitudinal axes of the openings of the adjacent reinforcing plates mutually intersect. As illustrated in FIG. 9, it is preferred that the size of the opening of each reinforcing plate be such that the length in the longitudinal direction of a hole (longitudinal axis) of the mutually intersecting rectangular shape when laminated together, is longer than the two overlapping holes of the intersecting counterpart. That is, as shown in FIG. 9, it is preferred to have the relationships X>y and Y>x therein, where X is the length in the longitudinal direction of a hole of the first reinforcement plate; x is equal to the width in the lateral direction of the first plate plus twice the width of the pillar; Y is the length in the longitudinal direction of a hole of the second reinforcing plate; and y is equal to the width in the lateral direction of the second plate, plus twice the width of the pillar.

Such construction allows the gas passing through the reinforcing plates to have free paths not only in the direction of the thickness of the reinforcing plate, but also in the in-plane directions thereof. This provides much lower resistance against the flow of purified hydrogen gas compared to the prior art types illustrated in FIGS. 5 and 6, thereby improving the hydrogen flux performance.

The metal foil and the reinforcing plates may be bonded together by diffusion bonding or brazing into a bonded member (a hydrogen separation membrane incorporating the principles of the present invention). In the case of a flat-sheet model, the joint member is overlaid onto a base plate having gas-passage grooves or open holes followed by brazing, diffusion bonding, seal welding, or the like to join the periphery, thereby generating a hydrogen separation membrane member for use. In the case of a tubular type, the membrane is wrapped around the exterior of a base pipe with open gas-passage holes followed by seal welding the periphery of the joint to generate a hydrogen separation membrane member.

The above structure, in spite of a thin hydrogen-permeable metal foil 2–50 μm, is strong enough to fully withstand repeated pressurization and heating cycles with the pressure between the front and the back sides of the metal foil held at 10 kgf/cm² G or greater at a service temperature of 500°–600° C. A sufficient passage for purified hydrogen gas can be obtained by having a large percentage of the reinforcing plate containing openings and by overlaying elongated holes such as rectangular or similarly shaped holes to intersect, preferably at right angles.

The preferred temperature range for using the hydrogen separation membrane embodiments of this invention is 800° C. or less, preferably 300°–600° C.; and the preferred range of the hydrogen pressure difference between the two sides of the hydrogen separation membrane is 0.5–10 kg/cm² G. The hydrogen flux is extremely high and is about 50–120 Ncc/min·cm² at 500° C. and a pressure difference of 2 kg/cm² G, about 2 to 3 times the level of the prior art.

Several examples of fabricating hydrogen separation membranes incorporating the principles of the present invention will now be described:

EXAMPLE NO. 1

Figure 1A:
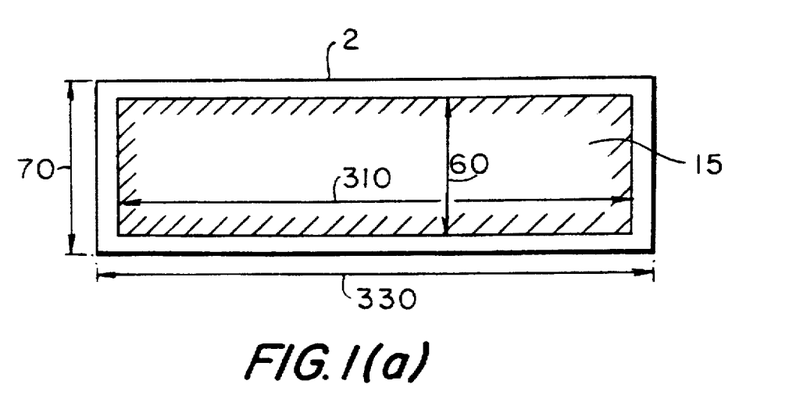
Figure 1B:
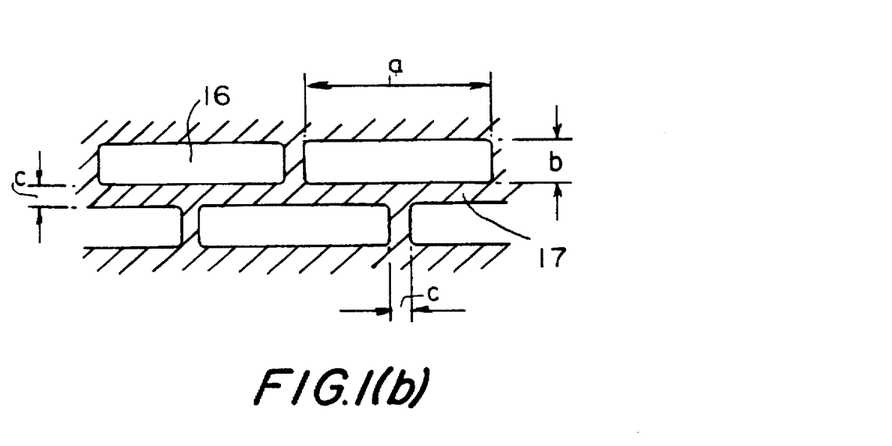

A hydrogen separation membrane was fabricated with a 20 μm thick, 70 mm wide, and 330 mm long palladium-23 wt. % silver alloy foil as a hydrogen-permeable metal foil along with stainless steel SUS430 reinforcing plates A and B. The reinforcing plates were fabricated by etching. First, both sides of a stainless steel SUS430 plate of a designated thickness were coated with a 2 μm thick ultraviolet-curable resist and dried, to which was pasted a film having a hole-opening pattern. The resist was cured by irradiation with ultraviolet light followed by water washing to remove the film and the uncured resist portions. The areas from which the resist was removed were etched with ferric chloride solution to provide the open holes. The etchant solution temperature was 50° C. and the etching was carried out for about 2 minutes both from the front and back sides. The configuration and size of the reinforcing plates A and B [see FIG. 2(a)] are as illustrated in FIG. 1(a); and the thickness and hole configuration and dimensions are given in FIG. 1(b), which is an expanded view of the opening of FIG. 1(a) and in Table 1. The opening 15 of reinforcing plate 2 is made up of a hole 16 and a pillar 17, where the corners of each hole are slightly rounded off by the etching process (radius of corners≈a/3).

TABLE 1

| Reinforcing Plate | Dimension (mm) | | | | Percent Opening (%) |
|---|---|---|---|---|---|
| | Thickness | a | b | c | |
| A | 0.1 | 1 | 0.18 | 0.02 | 87 |
| B | 0.3 | 2 | 0.54 | 0.06 | 86 |

Figure 2A:
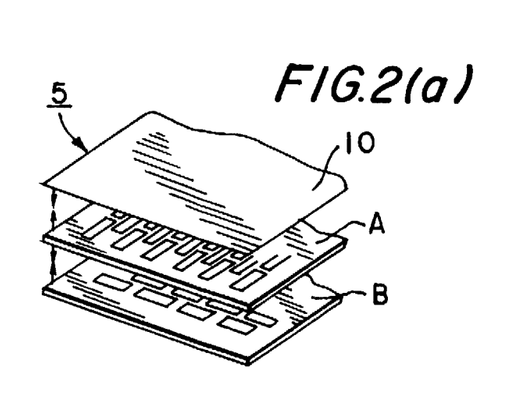
Figure 2B:
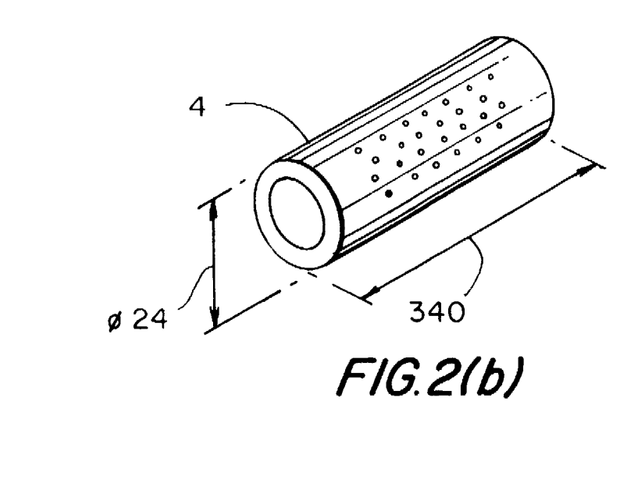
Figure 2C:
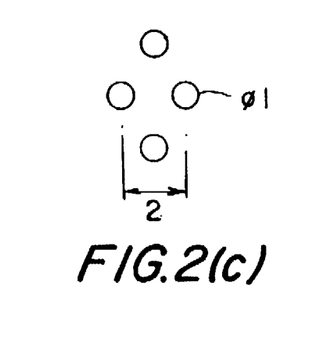
Figure 2D:
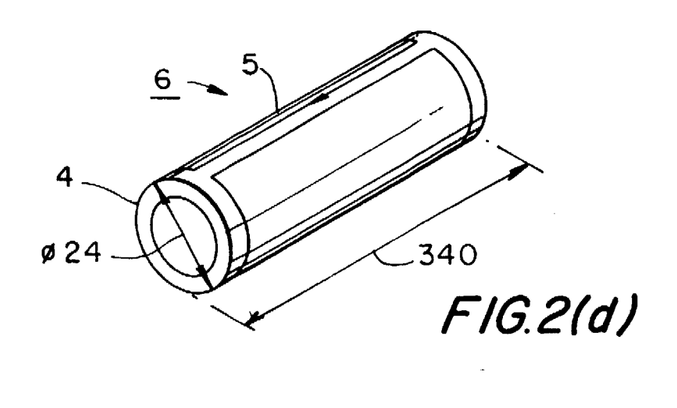

A hydrogen separation membrane and a tubular hydrogen separation member were fabricated using the above hydrogen-permeable metal foil and reinforcing plates. Referring to FIG. 2, the fabrication steps are shown schematically. First, as shown in FIG. 2(a), a hydrogen-permeable metal foil 10 was overlaid to reinforcing plates A and B with the longitudinal axes of the rectangular holes of the reinforcing plates A and B intersecting each other at a right angle, followed by diffusion bonding the entire contact areas to fabricate a bonded member 5. The diffusion bonding was made with the use of a silver insert material in a vacuum at 500° C. under an applied pressure of 2 kgf/mm². As shown in FIG. 2(b), the resultant bonded member 5 was wrapped around a base tube 4, 24 mm in diameter and 340 mm long, with 1 mm diameter holes opened therethrough [see FIG. 2(c)], followed by seal welding the periphery to obtain a hydrogen separation membrane member 6, as shown in FIG. 2(d). The seal welding was carried out by carbon dioxide laser welding.

The prototype hydrogen separation membrane member was subjected to a hydrogen permeability performance test and a durability test running ascending and descending temperature and pressure cycles. As a result, the hydrogen flux rate per unit area of the hydrogen-permeable metal foil was 50 Ncc/min·cm² at 500° C. with the differential pressure at 2 kgf/cm² G. This corresponds to doubling the performance of 25 Ncc/min·cm² achieved by the prior art structure illustrated in FIG. 6.

No leaks were generated when the above member was subjected to 2,500 ascending-descending temperature (550° C. to 50° C.) and ascending and descending pressure (10 kgf/cm² G to 0 kgf/cm² G) cycles under the differential pressure of 10 kgf/cm²G between the front and the back sides of the hydrogen-permeable metal foil.

Thus, excellent data were obtained for both hydrogen-permeability performance and durability. The reinforcing plates and the like can be procured at low cost and the fabrication steps are only two, involving diffusion bonding and seal welding, with the yields reaching close to 100%, so that overall, the manufacturing cost can be reduced to about one-fifth that of the conventional structure.

EXAMPLE NO. 2

A flat-type hydrogen separation membrane member was fabricated as shown in FIG. 3. The hydrogen-permeable metal foil 10 was the same palladium/silver alloy, 10 μm thick, 80 mm wide, and 500 mm long, as that used in Example 1; the reinforcing plates were used as a laminate of three stainless steel SUS430 reinforcing plates A', B', and C' [see FIG. 3(b)] having the same peripheral dimension as that of the aforementioned metal foil and was fabricated by the same etching procedure as that of Example 1. FIG. 3(a) and Table 2 show dimensions such as the hole size of the reinforcing plates, and the like.

TABLE 2

| Reinforcing Plate | Thickness | a | b | c | Percent Opening (%) |
|---|---|---|---|---|---|
| A' | 0.05 | 0.5 | 0.09 | 0.01 | 88 |
| B' | 0.10 | 1.0 | 0.18 | 0.02 | 87 |
| C' | 0.40 | 2.0 | 0.60 | 0.06 | 85 |

(Dimension in mm)

Figure 3A:
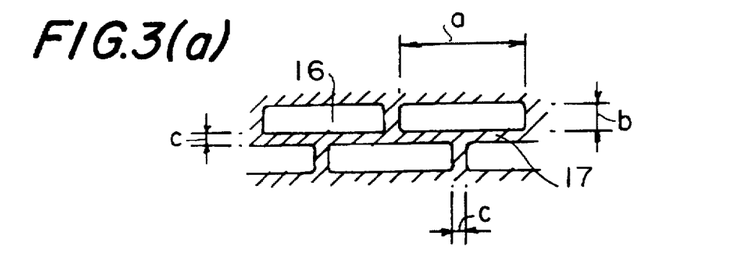
Figure 3B:
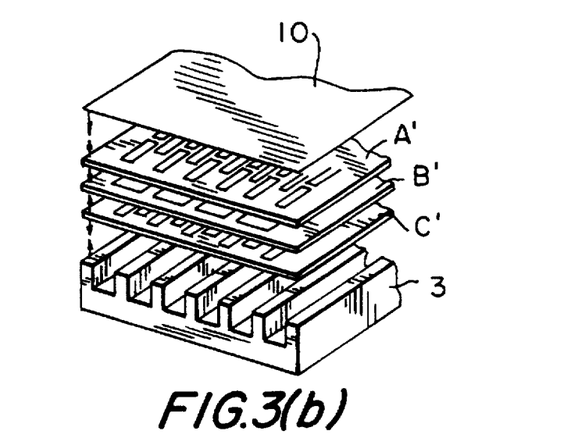
Figure 3C:
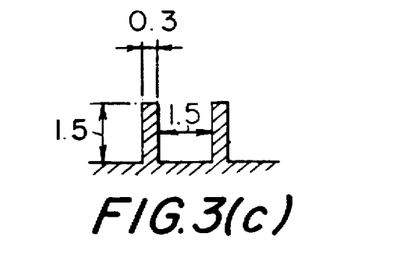
Figure 3D:
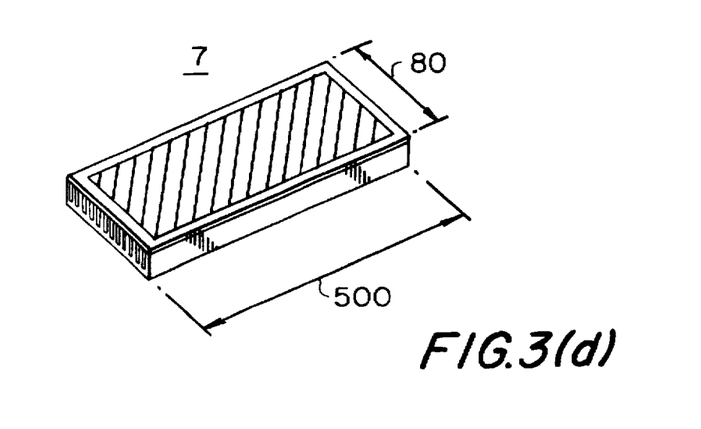

A flat-type hydrogen separation membrane member 7 [see FIG. 3(d)] was fabricated using a stainless steel SUS410 plate as a base plate 3 having grooves, 1.5 mm wide and 1.5 mm deep [illustrated by an expanded view in FIG. 3(c)], along with hydrogen-permeable metal foil 10, reinforcing plates A', B', and C', as illustrated in FIG. 3(b), so as to bring the longitudinal axes of the rectangular holes of the reinforcing plates A', B', and C' to intersect with each other at right angles followed by diffusion bonding. The diffusion bonding was carried out by the same method used in Example 1. The flat-type hydrogen separation membrane member, using the metal foil one-half the thickness of that of Example 1, showed an improvement in hydrogen flux to 75 Ncc/min·cm$^2$ (500° C., differential pressure 2 kgf/cm$^2$ G), and did not show any leaks after a test of 2,500 ascending and descending temperature and ascending and descending pressure cycles under the conditions of 550° C. and a differential pressure of 10 kgf/cm$^2$ G between the front or input side and the back or output side of the hydrogen-permeable metal foil, thereby demonstrating the same durability as with the tubular-type hydrogen separation membrane member of Example 1.

EXAMPLE NO. 3

Figure 4A:
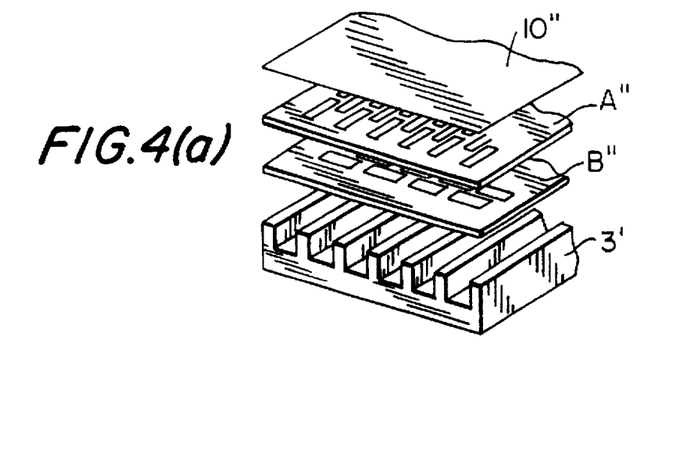
Figure 4B:
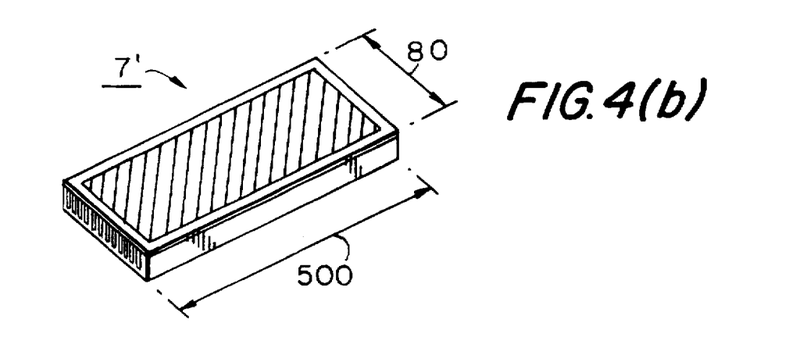

As shown in FIG. 4, a flat hydrogen separation membrane member 7' was fabricated using a hydrogen-permeable metal foil 10", composed of a 20 μm thick palladium/yttrium/silver alloy foil (palladium:yttrium:silver=85:5:10 wt. ratio), 80 mm wide and 500 mm long, reinforcing plates A" and B", made of the same material with the same hole-opening ratio for hole fabrication as those of Example 1 except for using different sized reinforcing plates, 80 mm wide and 500 mm long, and stainless steel SUS430 base plate 3' having the same size and shape as used in Example 2, followed by diffusion bonding in the same manner as that of Example 2. The resultant hydrogen separation membrane member 7' had a hydrogen-permeation performance at a hydrogen flux flow rate of 120 Ncc/min·cm$^2$ (500° C., differential pressure 2 kgf/cm$^2$ G).

Constructing a hydrogen separation membrane using a thin 2–50 μm thick hydrogen-permeable metal foil in combination with one or more reinforcing plates in a structure that can sufficiently ensure the path for purified hydrogen gas can permit a pressure difference between the front and the back sides of the hydrogen-permeable metal foil as large as 10 kgf/cm$^2$ G. Use of a hydrogen-permeable metal foil made of a material such as a palladium/yttrium/silver alloy or the like, highly hydrogen-permeable material, gave a resultant improvement, approximately doubling the conventional maximum performance capability for manufacturing purified-hydrogen. Such a structure enables the manufacturing costs to be reduced to about one-fifth the conventional costs.

The hydrogen separation membrane incorporating the principles of the present invention uses a thin, highly hydrogen-permeable metal foil and has a strength high enough to be used under high temperature and high pressure-difference conditions, advantageous for hydrogen permeation, and yet has gas flow paths to provide a sufficiently high gas flux, which is advantageous in harvesting purified hydrogen gas, thereby providing a substantial improvement in a purified gas-manufacturing capability over a conventional structural type. The only materials used in the hydrogen separation membrane are hydrogen-permeable metal foils and reinforcing plates, which when joined to base plates or tubes can be made into hydrogen separation membrane members; each material member is easy to fabricate; fabrication of a hydrogen separation membrane or hydrogen separation membrane member involves only diffusion bonding or seal welding, allowing fabrication at lower costs, both in raw materials and the cost of fabrication, than with prior art structures. The invention further has the advantage of ease of manufacture into any configuration, either flat or tubular type.

Various modifications will become possible for those skilled in the art after receiving the teachings of the present disclosure without departing from the scope thereof.

What is claimed is:

1. A membrane for separating purified hydrogen from a hydrogen-containing gas, comprising:

a hydrogen-permeable member adapted to have said hydrogen-containing gas applied to an input side thereof to produce substantially pure hydrogen at an output side; and a plurality of reinforcing members mounted adjacent said output side of said hydrogen-permeable member so that substantially all of said hydrogen gas passing through said output side also passes through said reinforcing members, each of said reinforcing members having a plurality of holes therein, each of said holes having a longitudinal and a lateral axis, said longitudinal axis being substantially longer than said lateral axis and said reinforcing members being mounted such that the longitudinal axes of the holes of adjacent reinforcing members intersect.

2. A membrane, as claimed in claim 1, wherein said holes are rectangular and said longitudinal axes intersect at substantially a right angle.

3. A membrane, as claimed in claim 1, wherein said hydrogen-permeable member is a metal foil and said reinforcing members are substantially planar.

4. A membrane, as claimed in claim 3, wherein said reinforcing members are laminated to said output side of said hydrogen-permeable member.

5. A hydrogen separation membrane, comprising:

a hydrogen-permeable metal foil laminated to a porous metal support, said metal support comprising a laminate of metal-reinforcing plates each having a plurality of hydrogen-flow-through holes, wherein said metal-reinforcing plates have elongated holes, each hole having a longitudinal axis, and a plurality of said metal-reinforcing plates being laminated together so that said longitudinal axes of the holes of adjacent metal-reinforcing plates intersect each other.

6. A hydrogen separation membrane, as set forth in claim 5, wherein said metal-reinforcing plates are constructed so that each hole of one of said plates overlaps at least two holes of the adjacent metal-reinforcing plates.

7. A hydrogen separation membrane, as claimed in claim 6, wherein said holes of each of said reinforcing plates have pillars therebetween and wherein a first plate is in contact with said metal foil, said first plate being thin and narrow in spacing between the pillars thereof, and is laminated to a second plate and a series of succeeding plates which are increasingly thicker and wider in pillar-to-pillar spacing.

8. A hydrogen separation membrane, as set forth in claim 6, wherein the hydrogen-permeable metal foil is a palladium foil.

9. A hydrogen separation membrane, as set forth in claim 6, wherein said hydrogen-permeable metal foil is a palladium-containing alloy foil.

10. A hydrogen separation membrane, as set forth in claim 5, wherein said holes of each of said reinforcing plates have pillars therebetween and wherein a first plate is in contact with said metal foil, said first plate being thin and narrow in spacing between the pillars thereof, and is laminated to a second plate and a series of succeeding plates which are increasingly thicker and wider in pillar-to-pillar spacing.

11. A hydrogen separation membrane, as set forth in claim 10, wherein the hydrogen-permeable metal foil is a palladium foil.

12. A hydrogen separation membrane, as set forth in claim 10, wherein said hydrogen-permeable metal foil is a palladium-containing alloy foil.

13. A hydrogen separation membrane, as set forth in claim 5, wherein the hydrogen-permeable metal foil is a palladium foil.

14. A hydrogen separation membrane, as set forth in claim 5, wherein said hydrogen-permeable metal foil is a palladium-containing alloy foil.

15. A hydrogen separation membrane, as set forth in claim 14, wherein said palladium-containing alloy is an alloy comprising palladium and silver.

16. A hydrogen separation membrane, as set forth in claim 14, wherein said palladium-containing alloy is an alloy of at least one metal selected from the group consisting of yttrium and the rare earth elements, and palladium.

17. A hydrogen separation membrane, as set forth in claim 14, wherein said palladium-containing alloy is an alloy comprising at least one metal selected from the group consisting of yttrium and the rare earth elements, palladium, and silver.

* * * * *